(12) United States Patent
Linzer et al.

(10) Patent No.: US 7,822,117 B1
(45) Date of Patent: Oct. 26, 2010

(54) VIDEO ENCODER RATE CONTROL USING BIT USAGE MEASURING AND ALLOCATING BY MACROBLOCK CLASSES

(75) Inventors: Elliot N. Linzer, Suffern, NY (US); Leslie D. Kohn, Fremont, CA (US)

(73) Assignee: Ambarella, Inc., Santa Clara, CA (US)

( * ) Notice: Subject to any disclaimer, the term of this patent is extended or adjusted under 35 U.S.C. 154(b) by 1426 days.

(21) Appl. No.: 11/241,357

(22) Filed: Sep. 30, 2005

(51) Int. Cl.
*H04N 7/12* (2006.01)
(52) U.S. Cl. .................................. 375/240.03; 382/251
(58) Field of Classification Search ............. 375/240.03
See application file for complete search history.

(56) References Cited

U.S. PATENT DOCUMENTS

| | | | | |
|---|---|---|---|---|
| 5,047,852 A * | 9/1991 | Hanyu et al. | ............. | 375/240.2 |
| 5,051,840 A * | 9/1991 | Watanabe et al. | ........... | 382/239 |
| 5,231,484 A * | 7/1993 | Gonzales et al. | ....... | 375/240.04 |
| 5,253,075 A * | 10/1993 | Sugiyama | ................... | 382/239 |
| 5,471,558 A * | 11/1995 | Tsutsui | ....................... | 704/219 |
| 5,598,213 A * | 1/1997 | Chung et al. | ........... | 375/240.04 |
| 5,686,962 A * | 11/1997 | Chung et al. | ........... | 375/240.16 |
| 5,699,119 A * | 12/1997 | Chung et al. | ........... | 375/240.04 |
| 5,847,766 A * | 12/1998 | Peak | ...................... | 375/240.24 |
| 5,892,548 A * | 4/1999 | Kim | ....................... | 375/240.04 |
| 5,933,194 A * | 8/1999 | Kim et al. | ................ | 348/403.1 |
| 5,990,957 A * | 11/1999 | Ryoo | ..................... | 375/240.03 |
| 6,167,375 A * | 12/2000 | Miseki et al. | ................ | 704/229 |
| 6,192,075 B1 * | 2/2001 | Jeng et al. | .................... | 375/240 |
| 6,198,878 B1 * | 3/2001 | Blawat et al. | ............... | 386/111 |
| 6,263,020 B1 * | 7/2001 | Gardos et al. | .......... | 375/240.03 |
| 6,600,783 B1 * | 7/2003 | Morita et al. | .......... | 375/240.03 |
| 6,915,018 B2 * | 7/2005 | Tajime | ....................... | 382/251 |
| 6,982,762 B1 * | 1/2006 | Hui | .......................... | 348/405.1 |
| 2002/0126752 A1 * | 9/2002 | Kim | ..................... | 375/240.03 |
| 2002/0136295 A1 * | 9/2002 | Sato | ..................... | 375/240.03 |
| 2002/0163964 A1 * | 11/2002 | Nichols | ................. | 375/240.03 |
| 2003/0067979 A1 * | 4/2003 | Takahashi et al. | ...... | 375/240.03 |
| 2003/0206584 A1 * | 11/2003 | Morita et al. | .......... | 375/240.02 |

* cited by examiner

*Primary Examiner*—Sath V Perungavoor
(74) *Attorney, Agent, or Firm*—Christopher P. Maiorana, PC (57) ABSTRACT

A method for video encoding is disclosed. The method generally includes the steps of (A) dividing a plurality of first macroblocks into at least two classes based on a plurality of first statistics, (B) measuring a respective number of bits used to encode the first macroblocks within each of the classes and (C) based on the measuring in step B, determining a quantization level in at least one of a plurality of second macroblocks that have yet to be encoded.

23 Claims, 5 Drawing Sheets

EQ.(3) CODING_RATE = BIT_RATE + ((BIT_RATE ÷ PICTURE_RATE) × N) - B

EQ.(4) SCALED_TYPE_CLASS_COMPLEXITY_SEC[TYPE][CLASS] = MBCOMPLEXITY[TYPE][CLASS] × NUMBER OF PICTURES OF TYPE "TYPE" PER SECOND × ACT_CNT[CLASS] ÷ QMUL[TYPE]

EQ.(5) SCALED_CLASS_COMPLEXITY_SEC[SEC] =
$\sum_{\text{ALL VALUES OF TYPE}}$ SCALED_TYPE_CLASS_COMPLEXITY_SEC[TYPE][CLASS]

EQ.(6) SCALED_COMPLEXITY_SEC = $\sum_{\text{CLASS} = 0 \ldots \text{NUM\_ACT\_SETS} - 1}$ SCALED_CLASS_COMPLEXITY_SEC[CLASS]

EQ.(7) BITS_PERSEC_CLASS[CLASS] = RES_FRAC × CODING_RATE × ACT_CNT[CLASS] ÷ MACROBLOCKS PER PICTURE + (1 - RES_FRAC) × CODING_RATE × SCALED_CLASS_COMPLEXITY_SEC[CLASS] ÷ SCALED_COMPLEXITY_SEC

EQ.(8) LINEAR_QUANT[CLASS] = SCALED_CLASS_COMPLEXITY_SEC[CLASS] × QMUL[TYPE] ÷ BITS_PERSEC_CLASS[CLASS]

EQ.(9) QP[CLASS] = 6 × $\log_2$(LINEAR_QUANT[CLASS])

EQ.(10) MBCOMPLEXITY[TYPE OF JUST ENCODED PICTURE][CLASS] = BITS USED FOR CLASS "CLASS" ÷ $2^{QP[CLASS]/6}$ ÷ NUMBER OF MACROBLOCKS IN CLASS "CLASS"

EQ.(11) MBCOMPLEXITY[TYPE OF JUST ENCODED PICTURE][CLASS] = ESTIMATE OF BITS USED FOR CLASS "CLASS" ÷ $2^{QP[CLASS]/6}$ ÷ NUMBER OF MACROBLOCKS IN CLASS "CLASS"

VIDEO ENCODER RATE CONTROL USING BIT USAGE MEASURING AND ALLOCATING BY MACROBLOCK CLASSES

FIELD OF THE INVENTION

The present invention relates to a method and/or architecture for video encoding generally and, more particularly, to video encoder rate control using bit usage measuring and allocating by macroblock classes.

BACKGROUND OF THE INVENTION

When lossy video compression is used, artifacts can be visible in decoded video. Use of high quantization values (i.e., coarse quantizations) reduces the bit usage but also makes quantization noise (i.e., coding noise) more visible. For a given quantization level, quantization noise is commonly more noticeable in smooth macroblocks and less noticeable in macroblocks with many pixel-to-pixel variations.

Figure 1:
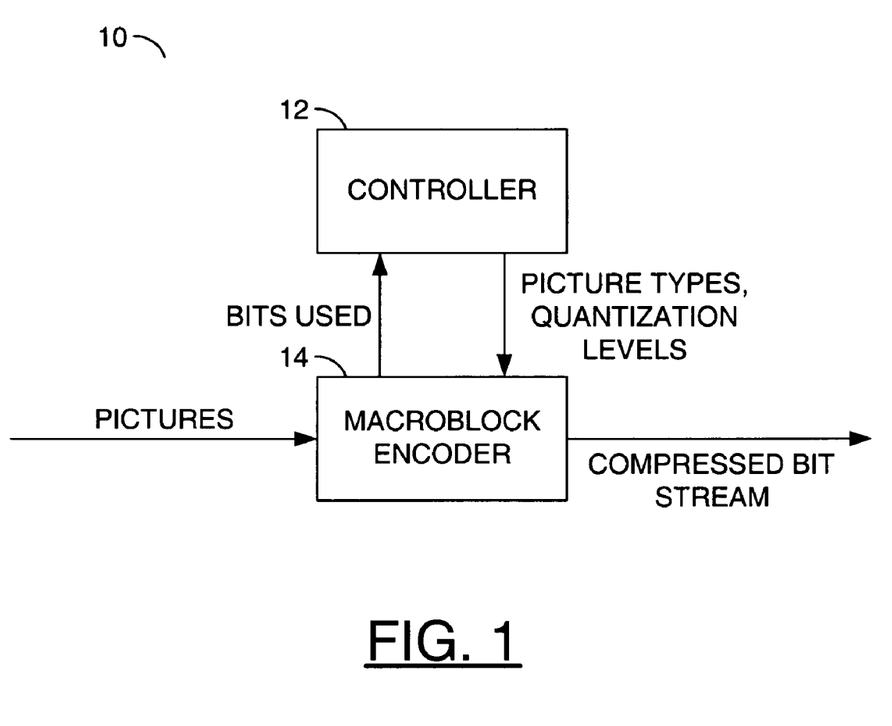
FIG. 1 is a block diagram of a portion of a conventional video encoder.

Referring to FIG. 1, a block diagram of a portion of a conventional video encoder 10 is shown. The conventional video encoder 10 (i.e., a compressor) can utilize conventional macroblock adaptive quantization (AQP) to adjust the quantization levels. A controller 12 of the encoder 10 makes measurements to determine a degree to which a macroblock will "show" quantization noise after being decoded. Typically, the measurements look at aspects of luminance sample variations and use quantization values that increase with the amount of the variations. A macroblock encoder 14 of the video encoder 10 then uses the quantization values to encode the macroblocks to generate a compressed bitstream. Another example of a conventional video encoder is a software encoder called Test Model 5. The Test Model 5 uses a block-variance based measure.

A linear quantization performed by a conventional encoder may be related to a quantization parameter. A linear quantization value (i.e., LINEAR_QUANT) is a number proportional to a quantization step size. In an H.264/AVC standard, a quantization parameter (i.e., QP) is an integer used to describe the quantization of a macroblock. The quantization parameter QP is related to the linear quantization by equation 1 as follows:

$$\text{LINEAR\_QUANT} = 2^{(QP/6)} \qquad \text{Eq. (1)}$$

Conventional adaptive quantization parameter (AQP) methods are based on an implicit model. The implicit models set the quantization parameter QP based on measured statistics to more or less equalize the visibility of quantization noise across all macroblocks. Because the models are not always accurate, the variations in minimum linear equalization to maximum linear quantization has to be limited. For example, a formula used in the Test Model 5 for AQP limits the ratio of maximum linear equalization to minimum linear quantization to 4:1 and, for normal video, the spread is typically much small (i.e., about 2:1). Even so, sequences exist where even a smaller spread in linear quantization results in better quality. Furthermore, sequences exist where a moderate spread in the linear quantization is not sufficient to provide adequate quality to very smooth macroblocks. For example, using just the measure and formulae from Test Model 5 produces a spread of 2:1, whereas a spread of 5:1 truly makes the smooth macroblocks look good.

SUMMARY OF THE INVENTION

The present invention concerns a method for video encoding. The method generally comprises the steps of (A) dividing a plurality of first macroblocks into at least two classes based on a plurality of first statistics, (B) measuring a respective number of bits used to encode the first macroblocks within each of the classes and (C) based on the measuring in step B, determining a quantization level in at least one of a plurality of second macroblocks that have yet to be encoded.

The objects, features and advantages of the present invention include providing video encoder rate control using bit usage measuring and allocating by macroblock classes that may (i) allocate macroblocks among multiple classes, (ii) determine a quantization parameter per class, (iii) intelligently decide when the quantization parameter should be lowered significantly for smooth macroblocks, (iv) intelligently decide when the quantization parameters should be lowered modestly for smooth macroblocks and/or (v) provide a robust adaptive quantization parameter technique.

BRIEF DESCRIPTION OF THE DRAWINGS

These and other objects, features and advantages of the present invention will be apparent from the following detailed description and the appended claims and drawings in which:

FIG. 3 is a set of equations;

DETAILED DESCRIPTION OF THE PREFERRED EMBODIMENTS

Figure 2:
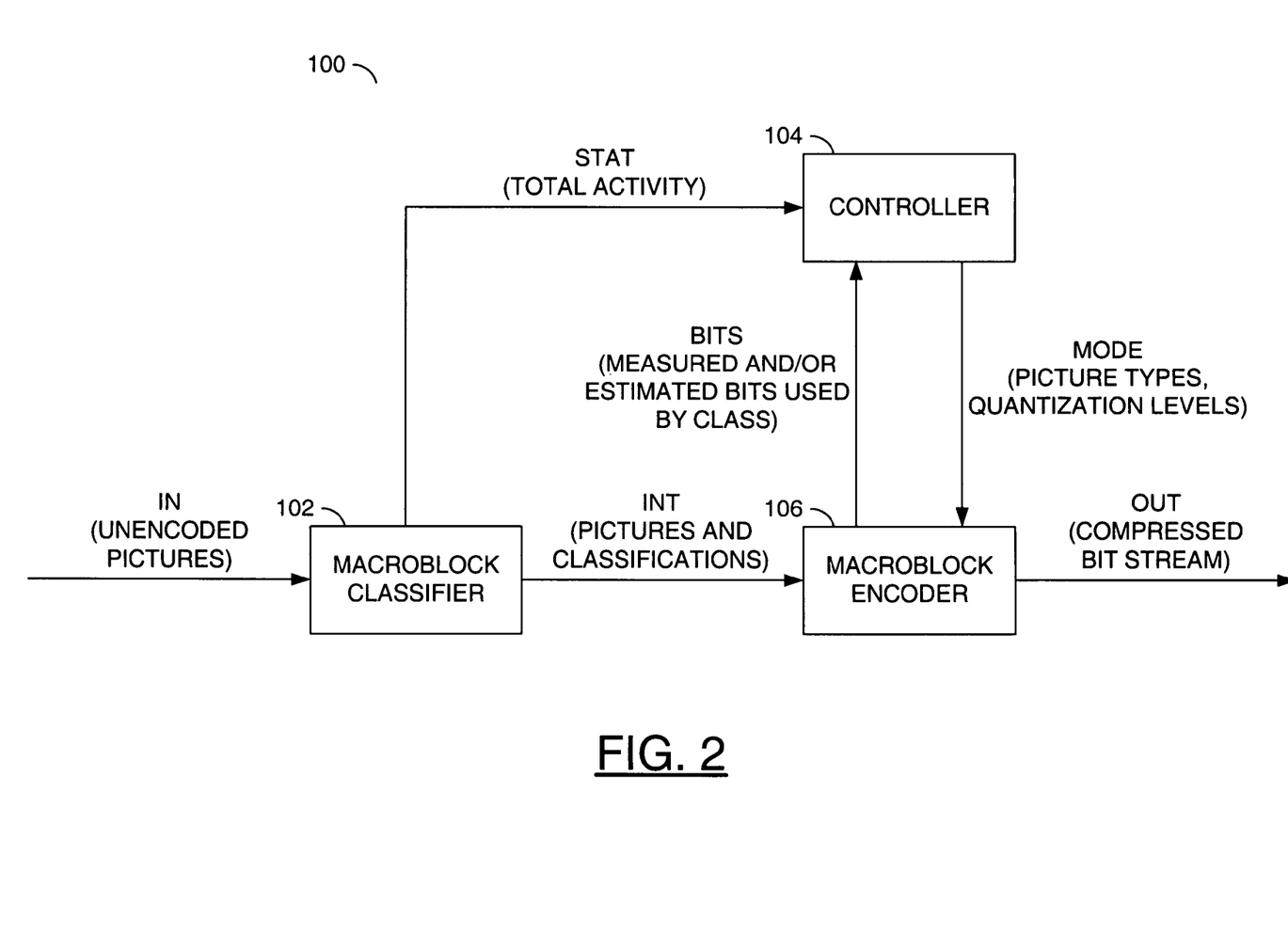
FIG. 2 is a block diagram of a portion of a circuit in accordance with a preferred embodiment of the present invention.

Referring to FIG. 2, a block diagram of a portion of a circuit 100 is shown in accordance with a preferred embodiment of the present invention. The circuit (or system) 100 may be referred to as an encoder circuit. The encoder circuit 100 generally comprises a module (or block) 102, a module (or block) 104 and a module (or block) 106. A signal (e.g., IN) may be received by the module 102. A signal (e.g., STAT) may be generated by the module 102 and presented to the module 104. A signal (e.g., INT) may be generated by the module 102 and presented to the module 106. The module 104 may generate a signal (e.g., MODE) presented to the module 106. The module 106 may generate and present a signal (e.g., BITS) to the module 104. A signal (e.g., OUT) may be generated by the module 106.

The encoder circuit 100 may be compliant with an H.264/AVC standard. The H.264/AVC specification (ISO/IEC 14496-10 AVC) is published by the International Telecommunication Union-Telecommunication Standardization Sector, Geneva, Switzerland. In other embodiments, the encoder circuit 100 may be compliant with other standards that have a variable quantization capability. Suitable standards include, but are not limited to H.261 and H.263.

The signal IN may be an input signal to the encoder circuit 100. The signal IN generally carries pictures (fields or frames) of unencoded digitized video. The pictures may be received by the module 102 in a normal display order sequence.

The signal STAT may be an internal signal to the encoder circuit 100. The signal STAT may carry statistical information regarding the spatial activity of the unencoded macroblocks making up the unencoded pictures received via the signal IN. The statistical information may include an average of activities for a picture and a number of macroblocks in each class. The activity may be computed as a weighted sum of an absolute value of Haddamard transform coefficients. The activities may be used as a previous activity value (e.g., PREV_ACT) in encoding a future picture. The number of macroblocks in each class may be used to compute a count value of macroblocks in each class (e.g., ACT_CNT). The module 104 may assign quantization levels based on the statistics.

The signal INT may be an internal signal to the encoder circuit 100. The signal INT generally comprises the unencoded pictures and class information. The unencoded pictures in the signal INT may be identical to the unencoded pictures received in the signal IN. The class information may identify a class for each macroblock in each unencoded picture.

The signal BITS may be an internal signal to the encoder circuit 100. The signal BITS generally carries historical information about the number of bits used to encode previously-encoded macroblocks in previously-encoded pictures. The number of bits may be arranged per class.

The signal MODE may be an internal signal to the encoder circuit 100. The signal MODE may convey information about what type of picture (e.g., Intra, Predicted or Bidirectional) and what quantization levels should be used for encoding yet-to-be-encoded macroblocks in each class.

The signal OUT may be an output signal from the module 106 and an internal signal relative to the encoder circuit 100. The signal OUT may undergo additional processing in the encoder circuit 100 after leaving the module 106. The signal OUT generally comprises a compressed bitstream of the pictures received in the signal IN. The compressed pictures in the signal OUT may vary in sequence from the normal display order sequence.

The module 102 may be referred to as a macroblock classifier module. The macroblock classifier module 102 may be operational to examine unencoded macroblocks received in the signal IN. Based on the examination, the macroblock classifier module 102 may allocate the unencoded macroblocks among two or more different classes (e.g., very smooth, smooth, textured, rough). The macroblock classifier module 102 may also be operational to generate statistical information about the unencoded pictures. The statistical information may be presented in the signal STAT.

The module 104 may be referred to as a controller module. The controller module 104 may be operational to generally control the encoding functionality of the encoder circuit 100. The controller module 104 may use (i) the statistical information of an incoming unencoded picture in the signal STAT and (ii) historical statistical information for one or more previously encoded pictures received in the signal BITS to determine how the unencoded macroblocks in the signal INT should be processed. Once the controller module 104 has determined how to encode each macroblock class, the controller module 104 may pass the information (e.g., picture type and quantization levels) along to the module 106 in the signal MODE.

The module 106 may be referred to as a macroblock encoder module. The macroblock encoder module 106 may be operational to encode the unencoded macroblocks received in the signal INT. The encodings may be controlled by the picture type information and the class-specific quantization level information received from the controller module 104 in the signal MODE. The encoded macroblock may be presented in the signal OUT as part of a compressed bitstream.

The macroblock encoder module 106 generally measures and/or estimates a number of bits used by the previously-encoded macroblocks in each of the different AQP classes (or categories). The number of bits may be used to determine how to set future quantization levels between the different classes of unencoded macroblocks. Specifically, the encoder circuit 100 may perform several measurements and allocations to determine the future quantization levels. 1) The macroblock classifier module 102 may make several measurements to classify each unencoded macroblock as belonging to one of a number of classes. The classification, generally separates the unencoded macroblocks into different AQP classes (e.g., different macroblocks with similar sensitivity to quantization noise and/or using about the same quantization for a certain visual quality may be put in the same class). 2) Measurements and/or estimations may be made by the macroblock encoder module 106 for the number of bits, historically used in each class. 3) Based on the measurements from step 2, an allocation of bits may be performed by controller module 104 among the classes for yet-to-be-encoded pictures. (4) Based on the allocations from step 3, a QP value may be set by the controller module 104 for each class for the yet-to-be-encoded pictures.

The following definitions and equations may be used in calculating the quantization levels for each class. Most of the equations may be found in FIG. 3. A complexity value (e.g., COMPLEXITY) may be defined by equation 2 as follows:

$$\text{COMPLEXITY} = \text{LINEAR\_QUANT} \times \text{bits used} \qquad \text{Eq. (2)}$$

An average macroblock complexity (e.g., MBCOMPLEXITY[type][class]) may be a function of picture type and class (category or set). Picture types generally include I (e.g., Intra coded), P (e.g., Predicted) and B (e.g., Bidirectional predicted). Class is generally a grouping in which the unencoded macroblock is placed for AQP purposes. In some embodiments, four classes may be implemented for each of the three picture types resulting in twelve macroblock classes. Other numbers of picture types and other numbers of macroblock classes (categories or sets) may be implemented to meet the criteria of a particular application.

A linear quantization multiplier (e.g., QMUL[type]) may be a function of the picture type. The targeted linear quantization level in a picture of type "type" is generally proportional to QMUL[type]. Typically, QMUL[I]<QMUL[P]<QMUL[B], because using a lowest-quantization in I pictures and a highest quantization in B pictures generally yields a best quality. In various embodiments, the values of QMUL[x] may be determined by observing the quality in test video sequences. In some embodiments, the values of QMUL[x] may vary over time.

A number of activity sets (e.g., classes/categories) value (e.g., NUM_ACT_SETS) generally identifies an actual number of classes per picture type used for AQP purposes. In some embodiments, the value of NUM_ACT_SETS may be four. Larger or smaller numbers of classes may be implemented to meet the criteria of a particular application.

The count of macroblocks in each spatial activity class value ACT_CNT[class] generally defines a number of macroblocks in each class. The value of ACT_CNT[class] may be set equal to the number of macroblocks in a previously encoded picture that was categorized as being in a class "class".

Macroblocks are generally classified by the macroblock classifier module 102 based on a measure of spatial activity. In some embodiments, four classes may be defined for the unencoded macroblocks. The activity measure for a common (e.g., 16×16) macroblock may be computed as follows. 1) Use a 16×16 Intra DC prediction to predict luminance samples of the macroblock. An example of the Intra DC prediction may be found in the H.264/AVC specification. 2) Compute a Haddamard transform of a prediction difference for determining if the Intra DC prediction should be used. An example of the Haddamard transform may be found in the JVT encoder software version 7.3 available from http://ip-home.hhi.de/suehring/tml/download/old_jm/. 3) Compute an activity value (e.g., ACTIVITY) for the macroblock as a weighted sum of absolute transform coefficients.

Once the activity value of the macroblock has been calculated, the macroblock may be classified based on (i) previous activity of one or more frames that have already been encoded and (ii) a set of thresholds. For example, let the previous activity value PREV_ACT be the average activity of a previous frame that has already been encoded and is closest in time (of all encoded frames) to a new frame being encoded. The class of a new macroblock in the new frame may be determined by:

If (ACTIVITY<PREV_ACT×M0), then class=0
Else if (ACTIVITY<PREV_ACT×M1), then class=1
Else if (ACTIVITY<PREV_ACT×M2), then class=2
Else class=3

Where each of the thresholds M0, M1 and M2 may be constants of increasing value (e.g., M0<M1<M2). As such, each class may have a unique range of activity values.

Figure 4:
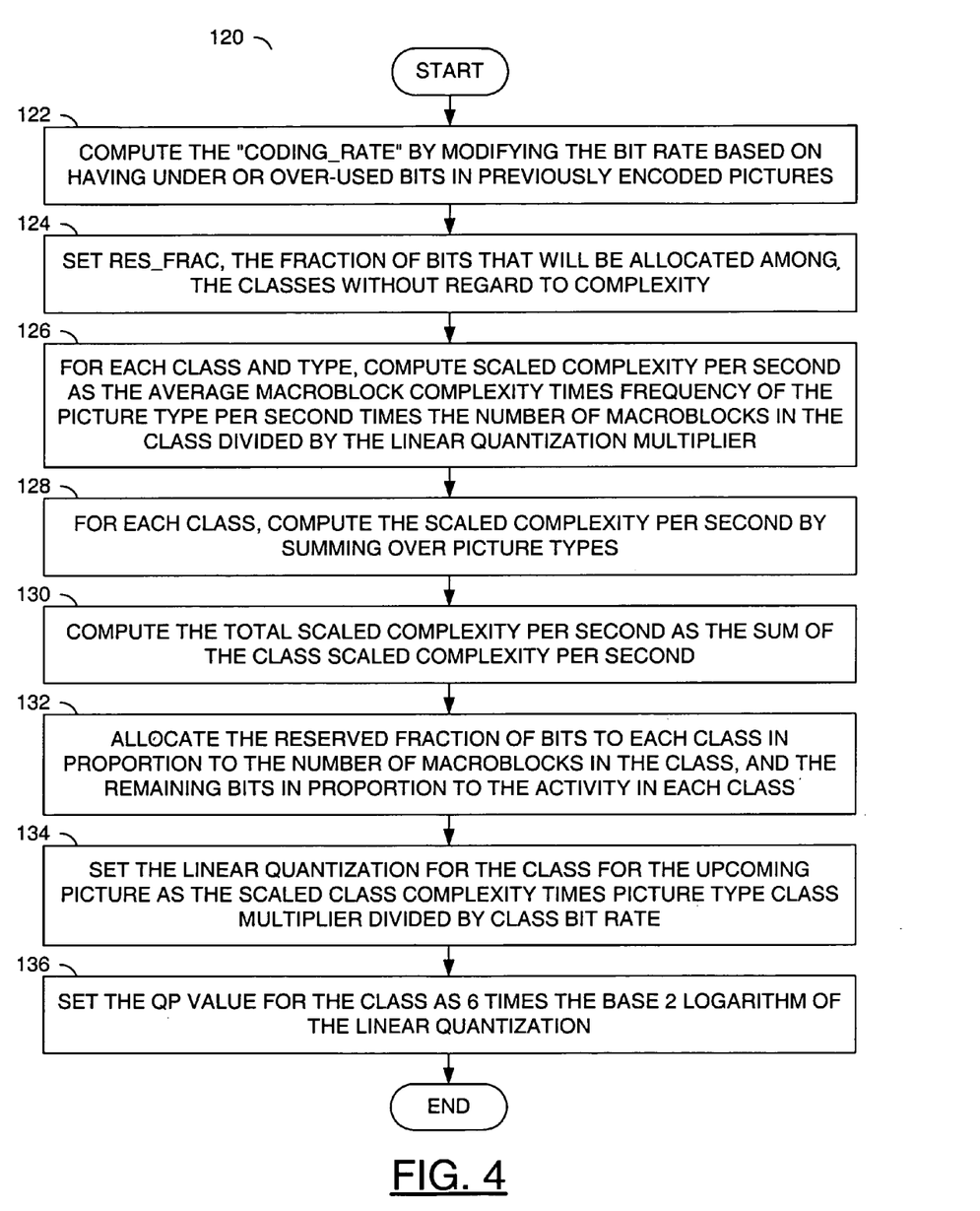
FIG. 4 is a flow diagram of an example process performed before encoding the new picture.

Referring to FIG. 4, a flow diagram of an example process 120 performed before encoding the new picture is shown. The process (or method) 120 generally comprises a step (or block) 122, a step (or block) 124, a step (or block) 126, a step (or block) 128, a step (or block) 130, a step (or block) 132, a step (or block) 134 and a step (or block) 136. The process 120 may be performed between the controller module 104 and the macroblock encoder module 106.

The process 120 may begin in the step 122 with the macroblock encoder module 106 computing a coding rate value (e.g., CODING_RATE). The value CODING_RATE may be determined by modifying a target bit rate based on having under-utilized bits or over-utilized bits in previously encoded pictures. For example, if (i) the average bit rate (in bits/second) has a predetermined value (e.g., BIT_RATE), (ii) a picture rate (in pictures/second) has a value (e.g., PICTURE_RATE), and (iii) B bits were used to encode N pictures, the value CODING_RATE may be computed per equation 3 in FIG. 3. If the encoder circuit 100 has overproduced bits, CODING_RATE<BIT_RATE. If the encoder circuit 100 has under-produced bits, CODING_RATE>BIT_RATE. The step 122 may feed back an indication of bit over production or bit under production to achieve a correct long-term rate.

In the step 124, a reserved fraction value (e.g., RES_FRAC) may be set to a predetermined value stored in the controller module 104. The value RES_FRAC may be a fraction of a total number of bits allocatable among the classes without regard to complexity. The value RES_FRAC generally ranges from zero (e.g., no AQP) to one (e.g., bit allocation is proportional to a number of macroblocks in each class). In various embodiments, the value of RES_FRAC may be set to approximately 0.5 (e.g., a mixed approach to AQP).

For each class and type, a scaled complexity per second value (e.g., SCALED_TYPE_COMPLEXITY_SEC) may be computed by the controller module 104 in the step 126. The value SCALED_TYPE_COMPLEXITY_SEC may be the average macroblock complexity times a frequency of the picture type per second times a number of macroblocks in the class divided by the linear quantization multiplier. Equation 4 in FIG. 3 generally shows how to calculate the value SCALED_TYPE_COMPLEXITY_SEC as a function of both picture type and a macroblock class.

For each class, a scaled complexity per second value (e.g., SCALED_CLASS_COMPLEXITY_SEC) may be computed by the controller module 104 in the step 128. The value SCALED_CLASS_COMPLEXITY_SEC may be a summation over all picture type values of the scaled complexity per second values. Equation 5 in FIG. 3 generally shows how to calculate the scaled complexity per second value.

A total scaled complexity per second value (e.g., SCALED_COMPLEXITY_SEC) may be computed by the controller module 104 in the step 130. The value SCALED_COMPLEXITY_SEC may be a summation of all of the class scaled complexity per second value over all classes. Equation 6 in FIG. 3 generally shows how to calculate the scaled complexity per second value.

In the step 132, the controller module 104 may allocate the reserved fraction of bits to each class. The allocation (e.g., BITS_PRESEC_CLASS) to any particular class may be in proportion to the number of macroblocks in the particular class. The remaining bits may be allocated to the classes in proportion to the activity in each class. A calculation for the allocation may be provided by equation 7 in FIG. 3.

The controller module 104 generally sets a linear quantization value (e.g., LINEAR_QUANT) for each class for the upcoming picture in the step 134. The linear quantization as a function of class may be the scaled class complexity times the picture type class multiplier divided by the class bit rate. Equation 8 in FIG. 3 generally shows how to calculate the values LINEAR_QUANT.

The value QP for each class may be computed as a function of the class by the controller module 104 in the step 136. The value QP is generally set as several (e.g., 6) times a base 2 logarithm of the linear quantization for the class. Equation 9 in FIG. 3 generally shows how to calculate the value QP.

To understand why the process 100 works, consider the following three cases. For a case 0 (e.g., RES_FRAC=0), the bits per class may be allocated in proportion to class complexity. Since class complexity may be proportional to linear quantization and an upcoming linear quantization may be proportional to complexity, the upcoming linear quantization will generally be the same for all classes. Therefore, the upcoming values QP may be the same for all classes. For case 0, the encoder system 100 generally does not perform any adaptive quantization.

For a case 1 (e.g., RES_FRAC=1), the bits per class may be allocated in proportion to the number of macroblocks in the class. If the lower classes (e.g., lower activity classes) may be "easier" to encode (e.g., use fewer bits for a given quantization level), the lower classes generally use a finer quantization (e.g., a smaller linear quantization) and therefore smaller values for QP.

Case 2 (e.g., 0<RES_FRAC<1) is generally somewhere in-between case 0 and case 1 (e.g., RES_FRAC≈0.5). Therefore, if the lower classes are easier to encode, the lower classes may use lower values of QP. However, the lower values of QP in case 2 are generally not as low as the values of QP in case 1. For both case 1 and case 2, when the lower classes are much easier to encode than the higher classes, the lower classes may receive a much lower value of QP than the higher classes.

Case 2 generally reallocates (e.g., takes away) at most half of the bits from any class. As a result, the value QP in any class losing bits may be increased by at most 6 (e.g., double linear quantization). Thus, the process 120 generally has (i) an unlimited lowering potential for lowering quantization in the "easy" classes and (ii) a firm limit on how the value QP may be increased in the "hard" classes. A conventional encoder (e.g., Test Model 5) does not have the behavior of the class 2.

In general, the value QP in the easy classes may be lowered by a large amount when the easy classes may be "very easy" to encode. Lowering the value QP a significant amount for the very easy macroblocks is generally beneficial if (i) a cost to the hard macroblocks is not high and (ii) the lower classes normally do not draw a reasonable number of bits with modest values of QP. Failure to draw a reasonable number of bits may result in many macroblocks in the lower classes with no coded transform coefficients. Such macroblocks generally have very noticeable quantization noise. The quantization noise may appear in the form of blockiness and/or a too smooth appearance.

Figure 5:
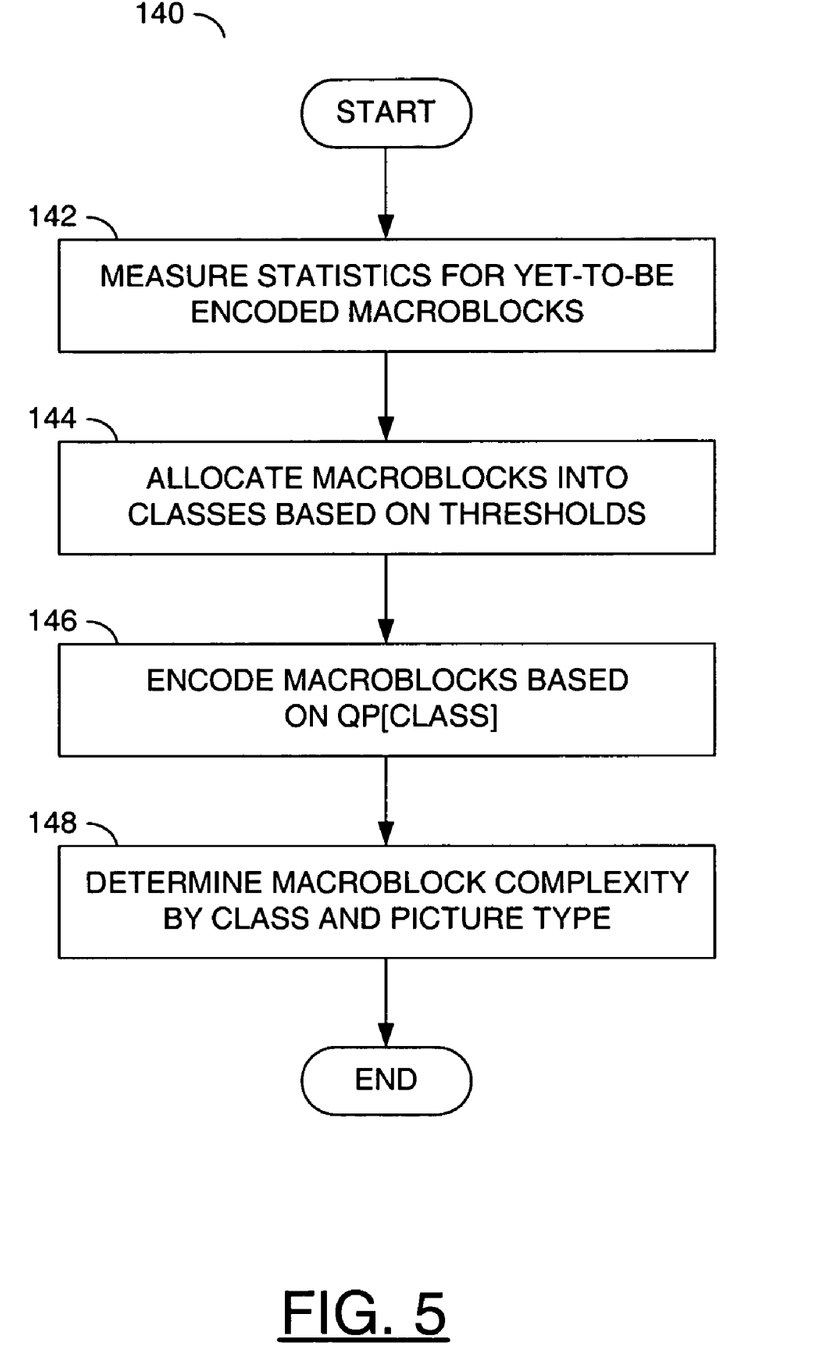
FIG. 5 is a flow diagram of an example process performed during and after encoding the new picture.

Referring to FIG. 5, a flow diagram of an example process 140 performed during and after encoding the new picture is shown. The process (or method) 140 generally comprises a step (or block) 142, a step (or block) 144, a step (or block) 146 and a step (or block) 148.

While encoding a new picture, each macroblock is generally classified by the macroblock classifier module 102 in the step 142. The classification of each new macroblock may be into one of the NUM_ACT_SETS classes (e.g., NUM_ACT_SETS=4 in various embodiments). Classification may be based on measured statistics for the new macroblocks. The value QP used for each new macroblock may be subsequently set to a class value QP calculated earlier while encoding one or more previous pictures.

The following statistics may be computed by the encoder module 106 while encoding a new picture. An average of activity statistic may be used as the previous activity value PREV_ACT for picture(s) to be encoded in the future. A bits-used-by-class statistic may be used to compute MBCOMPLEXITY[type] [class], as described above. A number of macroblocks in each class statistic may be used for computing MBCOMPLEXITY[type] [class]. The number of macroblocks in each class statistic may also be used in other steps before encoding the next picture. In a first embodiment, the actual number of bits by class may be counted and used for the statistic (e.g., ACT_CNT[class]). In a second embodiment, an approximation of the number of bits by class may be generated as the statistic.

After a new picture is encoded, the macroblock complexity by class and picture type may be recalculated for use in encoding subsequent new, yet-to-be-encoded pictures. In one embodiment, the calculation of the value MBCOMPLEXITY may be determined by equation 10 in FIG. 3. In another embodiment, an estimation of a number of bits per class may be determined by equation 11 in FIG. 3.

Assuming that relationships between the values QP, the bits used per class and the picture type are only slowly changing, control may be exercised over a degree to which using lower QP values for more "sensitive" macroblocks cause an excessive amount of bits to be consumed by the sensitive macroblocks. The control may be based on how many bits are generally used in each class. The number of bits used in each class may be measured and/or estimated. For example, if the classification step separates smooth macroblocks (e.g., macroblocks that get a lower value of QP) from spatially more complex macroblocks (e.g., macroblocks that get a higher value of QP), the smooth macroblocks may not utilize a high percentage of the overall number of available bits. Since the smooth macroblock classes do not consume many available bits, a big drop in the value QP for the smooth macroblocks may not be expensive. In particular, the smooth macroblock classes may not take a large absolute percentage of the total bit rate. Therefore, the encoder system 100 generally allows the smooth macroblock classes to have low QP values.

In cases where a low QP for smooth macroblocks may consume a large percentage of the total bit rate, the encoder circuit 100 may limit the degree to which the smooth macroblocks get the lower QP. Because the encoder circuit 100 generally measures bits by class, the encoder circuit 100 may intelligently decide when the value QP should be lowered (i) by a lot or (ii) by a little for the smooth macroblocks.

In situations where the QP values for the not-smooth macroblocks do not significantly increase due to a large decrease in QP values for the smooth macroblocks, a big QP difference between smooth macroblock classes and not-smooth macroblock classes may be implemented by the encoder system 100. In situations where the QP values for the not-smooth macroblocks increase significantly due to a large decrease in the QP values for the smooth macroblocks, a big QP difference between the smooth macroblock classes and the not-smooth macroblock classes are generally not implemented by the encoder circuit 100. The result may be an AQP method that is more robust than conventional methods.

The function performed by the flow diagrams of FIGS. 4 and 5 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a compute product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for video encoding, comprising the steps of:
   (A) dividing a plurality of first macroblocks in a first picture into at least two classes based on (i) a plurality of first statistics and (ii) previous activity of a previously encoded picture;
   (B) measuring a respective number of bits used to encode said first macroblocks within each of said classes; and
   (C) based on said measuring in step (B), determining a quantization level subsequently used to quantize at least one of a plurality of second macroblocks in a second picture that have yet to be encoded.

2. The method according to claim 1, further comprising the step of:
measuring a respective one of said first statistics for each of said first macroblocks.

3. The method according to claim 1, wherein said respective number of bits are used in an adaptive quantization for said video encoding.

4. The method according to claim 1, wherein step (C) comprises the sub-step of:
determining a respective quantization level for each of said classes based on said respective number of bits, wherein said respective quantization levels are subsequently used to quantize said second macroblocks per said classes.

5. The method according to claim 4, wherein step (C) further comprises the sub-step of:
computing a respective complexity for each of said classes based on said first macroblocks within said classes, wherein said respective quantization levels are further based on said respective complexities.

6. The method according to claim 1, further comprising the steps of:
measuring a plurality of second statistics for said second macroblocks;
dividing said second macroblocks into said classes based on said second statistics; and
encoding said second macroblocks in each of said classes based on respective quantization levels determined while encoding said first macroblocks.

7. The method according to claim 1, wherein each of said respective first statistics comprise a measure of spatial activity in one of said first macroblocks.

8. The method according to claim 1, wherein step (A) comprises the sub-step of:
allocating each of said first macroblocks having said respective first statistic less than a first threshold to a first of said classes.

9. The method according to claim 8, wherein step (A) further comprises the sub-step of:
allocating each of said first macroblocks having said respective first statistic greater than said first threshold and less than a second threshold to a second of said classes.

10. A method for video encoding, comprising the steps of:
(A) dividing a plurality of first macroblocks in a first picture into at least two classes based on (i) a plurality of first statistics and (ii) previous activity of a previously encoded picture;
(B) estimating a respective number of bits used to encode said first macroblocks within each of said classes; and
(C) based on said estimating in step (B), determining a quantization level subsequently used to quantize at least one of a plurality of second macroblocks in a second picture that have yet to be encoded.

11. The method according to claim 10, further comprising the step of:
measuring a respective one of said first statistics for each of said first macroblocks.

12. The method according to claim 10, wherein said respective number of bits are used in an adaptive quantization for encoding said second macroblocks.

13. The method according to claim 10, wherein step (C) comprises the sub-step of:
determining a respective quantization level for each of said classes based on said respective number of bits, wherein said respective quantization levels are subsequently used to quantize said second macroblocks per said classes.

14. The method according to claim 13, wherein step (C) further comprises the sub-step of:
computing a respective complexity for each of said classes based on said first macroblocks within said classes, wherein said respective quantization levels are further based on said respective complexities.

15. The method according to claim 10, further comprising the step of:
allocating a fraction of a total number of bits available for encoding among said classes independently of a respective class complexity for each of said classes.

16. The method according to claim 10, wherein each of said respective first statistics comprise a measure of spatial activity in one of said first macroblocks.

17. The method according to claim 10, step (A) comprises the sub-step of:
allocating each of said first macroblocks having said respective first statistic less than a first threshold to a first of said classes.

18. The method according to claim 17, wherein step (A) further comprises the sub-step of:
allocating each of said first macroblocks having said respective first statistic greater than said first threshold and less than a second threshold to a second of said classes.

19. A circuit comprising:
a classifier module configured to divide a plurality of first macroblocks in a first picture into at least two classes based on (i) a plurality of first statistics and (ii) previous activity of a previously encoded picture;
an encoder module configured to determine a respective number of bits used to encode said first macroblocks within each of said classes; and
a controller module configure to determine a quantization level subsequently used to quantize at least one of a plurality of second macroblocks in a second picture that have yet to be encoded based on said respective number of bits.

20. The circuit according to claim 19, wherein (i) said controller module is further configured to determine a respective quantization level for each of said classes based on said respective number of bits and (ii) said respective quantization levels are subsequently used to quantize said second macroblocks per said classes.

21. The circuit according to claim 20, wherein (i) said controller module is further configured to compute a respective complexity for each of said classes based on said first macroblocks within said classes and (ii) said respective quantization levels are further based on said respective complexities.

22. The circuit according to claim 19, wherein said classifier module is further configured to calculate a total activity value for said first macroblocks and transfer said total activity value to said controller module.

23. The circuit according to claim 19, wherein said at least two classes comprises four classes for each of a plurality of picture types.

* * * * *